(12) United States Patent
Yenamandra et al.

(10) Patent No.: US 7,885,256 B1
(45) Date of Patent: Feb. 8, 2011

(54) SAN FABRIC DISCOVERY

(75) Inventors: Rekha Yenamandra, Santa Clara, CA (US); William Kawakami, Belmont, CA (US)

(73) Assignee: Symantec Operating Corporation, Mountain View, CA (US)

( * ) Notice: Subject to any disclaimer, the term of this patent is extended or adjusted under 35 U.S.C. 154(b) by 1869 days.

(21) Appl. No.: 10/449,797

(22) Filed: May 30, 2003

(51) Int. Cl.
*H04L 12/28* (2006.01)

(52) U.S. Cl. .................. 370/389; 370/401; 370/400; 370/398

(58) Field of Classification Search ............. 709/224, 709/220, 209; 370/254, 252, 422, 401, 400, 370/389, 398
See application file for complete search history.

(56) References Cited

U.S. PATENT DOCUMENTS

| | | | |
|---|---|---|---|
| 6,085,200 A | 7/2000 | Hill et al. | |
| 6,253,240 B1 * | 6/2001 | Axberg et al. | 709/223 |
| 6,347,342 B1 | 2/2002 | Marcos et al. | |
| 6,353,612 B1 * | 3/2002 | Zhu et al. | 370/360 |
| 6,389,432 B1 | 5/2002 | Pothapragada et al. | |
| 6,400,730 B1 | 6/2002 | Latif et al. | |
| 6,601,187 B1 | 7/2003 | Sicola et al. | |
| 6,606,690 B2 * | 8/2003 | Padovano | 711/148 |
| 6,629,963 B2 * | 10/2003 | Prais et al. | 604/274 |
| 6,636,239 B1 | 10/2003 | Arquie | |
| 6,640,278 B1 | 10/2003 | Nolan et al. | |
| 6,646,984 B1 * | 11/2003 | Mehra et al. | 370/220 |
| 6,654,747 B1 | 11/2003 | Van Huben et al. | |
| 6,671,776 B1 | 12/2003 | DeKoning | |
| 6,697,924 B2 | 2/2004 | Swank | |
| 6,714,952 B2 | 3/2004 | Dunham et al. | |
| 6,738,821 B1 | 5/2004 | Wilson et al. | |
| 6,769,022 B1 | 7/2004 | DeKoning et al. | |
| 6,807,181 B1 | 10/2004 | Weschler | |
| 6,826,580 B2 | 11/2004 | Harris et al. | |
| 6,839,750 B1 * | 1/2005 | Bauer et al. | 709/223 |
| 6,854,035 B2 | 2/2005 | Dunham et al. | |
| 6,920,491 B2 * | 7/2005 | Kim | 709/220 |
| 6,920,494 B2 * | 7/2005 | Heitman et al. | 709/223 |

(Continued)

OTHER PUBLICATIONS

"QLDIRECT QLogic Optimizing and Multipath Driver for Windows NT V4.0 and Windows 2000," (5 Pages), 2000.

(Continued)

*Primary Examiner*—Ricky Ngo
*Assistant Examiner*—Dewanda Samuel
(74) *Attorney, Agent, or Firm*—Robert C. Kowert; Meyertons, Hood, Kivlin, Kowert & Goetzel, P.C.

(57) ABSTRACT

System and method for discovering Storage Area Network (SAN) fabrics and mapping switches to the fabrics. Embodiments may collect switch information from one or more sources and examine the collected switch information to determine interconnections among the switches. From this information, one or more SAN fabrics of which the switches are components may be determined, and the switches mapped to the SAN fabrics of which they are components. Embodiments may use an out-of-band protocol such as SNMP to collect switch information for all switches that can be discovered, either from individual switches or from a central switch management server, and then traverse the switch information to construct a map of how the switches are connected. From the map, one or more SAN fabrics, and which switches are connected in the same fabric(s), may be determined.

17 Claims, 8 Drawing Sheets

U.S. PATENT DOCUMENTS

| | | | |
|---|---|---|---|
| 6,944,654 B1 | 9/2005 | Murphy et al. | |
| 6,947,939 B2 | 9/2005 | Fujibayashi et al. | |
| 6,959,373 B2 * | 10/2005 | Testardi | 711/203 |
| 6,971,044 B2 * | 11/2005 | Geng et al. | 714/11 |
| 6,980,525 B2 * | 12/2005 | Banks et al. | 370/254 |
| 7,003,567 B2 * | 2/2006 | Suzuki et al. | 709/224 |
| 7,072,986 B2 * | 7/2006 | Kitamura et al. | 709/249 |
| 7,103,626 B1 * | 9/2006 | Recio et al. | 709/201 |
| 7,161,935 B2 * | 1/2007 | Alonso et al. | 370/384 |
| 7,194,538 B1 * | 3/2007 | Rabe et al. | 709/224 |
| 7,330,897 B2 * | 2/2008 | Baldwin et al. | 709/229 |
| 7,334,033 B2 * | 2/2008 | Stimac | 709/224 |
| 7,340,167 B2 * | 3/2008 | McGlaughlin | 398/45 |
| 7,362,717 B1 * | 4/2008 | Betker | 370/254 |
| 7,433,326 B2 * | 10/2008 | Desai et al. | 370/255 |
| 7,466,712 B2 * | 12/2008 | Makishima et al. | 370/401 |
| 7,499,410 B2 * | 3/2009 | Dutt et al. | 370/254 |
| 2001/0054093 A1 | 12/2001 | Iwatani | |
| 2002/0095602 A1 | 7/2002 | Pherson et al. | |
| 2002/0099914 A1 | 7/2002 | Matsunami et al. | |
| 2002/0161871 A1 | 10/2002 | Shanthaveeraiah et al. | |
| 2002/0194407 A1 * | 12/2002 | Kim | 710/104 |
| 2003/0084076 A1 * | 5/2003 | Sekiguchi et al. | 707/205 |
| 2003/0085914 A1 | 5/2003 | Takaoka et al. | |
| 2003/0105830 A1 | 6/2003 | Pham et al. | |
| 2003/0130821 A1 * | 7/2003 | Anslow et al. | 702/186 |
| 2003/0140128 A1 | 7/2003 | Cox et al. | |
| 2003/0154267 A1 | 8/2003 | Comacho et al. | |
| 2003/0154268 A1 | 8/2003 | Sato | |
| 2003/0204701 A1 * | 10/2003 | Mimatsu et al. | 711/203 |
| 2003/0208589 A1 * | 11/2003 | Yamamoto | 709/224 |
| 2003/0212711 A1 * | 11/2003 | Fujibayashi et al. | 707/200 |
| 2003/0220991 A1 | 11/2003 | Soejima et al. | |
| 2003/0225993 A1 | 12/2003 | Yagisawa et al. | |
| 2004/0006612 A1 * | 1/2004 | Jibbe et al. | 709/223 |
| 2004/0010600 A1 * | 1/2004 | Baldwin et al. | 709/229 |
| 2004/0022200 A1 * | 2/2004 | Grabauskas et al. | 370/254 |
| 2004/0024863 A1 * | 2/2004 | Connor et al. | 709/224 |
| 2004/0025166 A1 | 2/2004 | Adlung et al. | |
| 2005/0094568 A1 * | 5/2005 | Judd | 370/242 |

OTHER PUBLICATIONS

"QLogic Software Suite Streamlines SAN Management," FCIA Member Company Press Release, Nov. 9, 1999, (3 Pages).

"The Architecture of Veritas SANPoint Control tm 2.0," Veritas Software Corporation, 2001, (42 Pages).

High Availability Storage Networks with the Cisco MDS 9500 Series of Multilayer Directors, Cisco Systems, Aug. 2002, (14 pages).

Scott Lukes, "Building Bulletproof Security When Connecting SANs over WANs, while maintaining gigabit speeds, presents challenges," InfoStor, Mar. 2002, (7 pages).

StorageWorks Fibre Channel SAN Switch 16-EL, Compaq, Mar. 21, 2002, (6 pages).

* cited by examiner

SAN FABRIC DISCOVERY

FIELD OF THE INVENTION

This invention is related to the field of storage management and, more particularly, to software used in storage management.

DESCRIPTION OF THE RELATED ART

In the past, large organizations relied heavily on parallel SCSI technology to provide the performance required for their enterprise data storage needs. More recently, organizations are recognizing that the restrictions imposed by SCSI architecture are too costly for SCSI to continue as a viable solution. Such restrictions include the following:

- SCSI disk arrays must be located no more than 25 meters from the host server;
- The parallel SCSI bus is susceptible to data errors resulting from slight timing discrepancies or improper port termination; and
- SCSI array servicing frequently requires downtime for every disk in the array.

One solution has been to create technology that enables storage arrays to reside directly on the network, where disk accesses may be made directly rather than through the server's SCSI connection. This network-attached storage (NAS) model eliminates SCSI's restrictive cable distance, signal timing, and termination requirements. However, it adds a significant load to the network, which frequently is already starved for bandwidth. Gigabit Ethernet technology only alleviates this bottleneck for the short term, so a more elegant solution is desirable.

The storage area network (SAN) model places storage on its own dedicated network, removing data storage from both the server-to-disk SCSI bus and the main user network. This dedicated network most commonly uses Fibre Channel technology, a versatile, high-speed transport. The SAN includes one or more hosts that provide a point of interface with LAN users, as well as (in the case of large SANs) one or more fabric switches, SAN hubs and other devices to accommodate a large number of storage devices. The hardware (e.g. fabric switches, hubs, bridges, routers, cables, etc.) that connects workstations and servers to storage devices in a SAN is referred to as a "fabric." The SAN fabric may enable server-to-storage device connectivity through Fibre Channel switching technology to a wide range of servers and storage devices. The versatility of the SAN model enables organizations to perform tasks that were previously difficult to implement, such as LAN-free and server-free tape backup, storage leasing, and full-motion video services.

Prior art SAN systems may include switch management servers that may maintain information about a plurality of switches that are managed by the server potentially in two or more SAN fabrics. The switch information may be maintained, for example in one or more Simple Network Management Protocol (SNMP) management information bases (MIBs). An exemplary switch management server is McDATA® Corporation's Enterprise Fabric Connectivity Manager (EFCM) that can control up to 64 different switches, potentially in two or more SAN fabrics.

In the prior art, when communicating with any switch or central switch management server to discover switch and SAN fabric information, it is assumed that information about a single SAN fabric is being accessed. As noted above, some central switch management servers may maintain switch information for two or more SAN fabrics. Prior art mechanisms do not provide the capacity to discover and distinguish different SAN fabrics and identify switches with the correct SAN fabrics by querying a central switch management server and/or switch(es). Switches belonging to different SAN fabrics showed up as within a single fabric, with the result that management commands such as zoning could not be routed correctly to a switch. Therefore, it is desirable to provide a mechanism for discovering multiple SAN fabrics and their associated switches from switch information accessed from a central switch management server and/or switches.

SUMMARY OF THE INVENTION

Embodiments of a system and method for discovering Storage Area Network (SAN) fabrics and mapping switches to the fabrics are described. Switch management servers may maintain information about switches (e.g. Fibre Channel (FC) switches) that are managed by the switch management server, potentially in two or more SAN fabrics. The system and method for discovering SAN fabrics and mapping switches to the fabrics may be referred to herein as a fabric discovery mechanism.

Embodiments of the fabric discovery mechanism may collect switch information from one or more sources and examine the collected switch information to determine interconnections among the switches. The switch information may be maintained, for example in Simple Network Management Protocol (SNMP) management information bases, (MIBs). From this information, one or more SAN fabrics of which the switches are components may be determined, and the switches may be mapped to the appropriate SAN fabrics of which they are components. Output may include graphical and/or textual representations of the determined SAN fabrics.

One embodiment may discover multiple SAN fabrics and their component switches managed by a switch management server by accessing switch information maintained by the switch management server using an out-of-band protocol such as SNMP. One embodiment may collect switch information for all switches that can be discovered, either from individual switches or from a central switch management server, and then traverse the switch information to construct a map of how the switches are connected. From the map, one or more SAN fabrics, and which switches are connected in the same fabric(s), may be determined.

Embodiments may be used, for example, in SAN management systems to discover one or more SAN fabrics and map switches to the fabrics from switch information collected from one or more entities such as switch management servers and/or individual switches. The discovered SAN fabric information may then be provided to the SAN management system to be used in various SAN management tasks and/or to be graphically or textually displayed to the user, e.g. on a SAN management console.

BRIEF DESCRIPTION OF THE DRAWINGS

The following detailed description makes reference to the accompanying drawings, which are now briefly described.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of a system and method for discovering Storage Area Network (SAN) fabrics and mapping switches to the fabrics are described. Switch management servers such as McDATA's EFCM may maintain information about a plurality of switches (e.g. Fibre Channel (FC) switches) that are managed by the switch management server, potentially in two or more SAN fabrics. The switch information may be maintained, for example in Simple Network Management Protocol (SNMP) management information bases (MIBs). The system and method for discovering SAN fabrics and mapping switches to the fabrics may be referred to herein as a fabric discovery mechanism.

Embodiments of the fabric discovery mechanism may collect switch information from one or more sources (e.g. central switch management servers and/or switches) and examine the collected switch information to determine interconnections among the switches. From this information, one or more SAN fabrics of which the switches are components may be determined, and the switches may be mapped to the appropriate SAN fabrics of which they are components. Output may include graphical and/or textual representations of the determined SAN fabrics.

One embodiment may discover multiple SAN fabrics and their component switches managed by a switch management server by accessing switch information maintained by the switch management server (e.g. in one or more MIBs) using an out-of-band protocol such as SNMP. One embodiment may collect MIBs for all switches that can be discovered, either from individual switches or from a central switch management server (e.g. McDATA's EFCM), and then traverse the switch information in the MIBs to construct a map of how the switches are connected. From the map, one or more SAN fabrics, and which switches are connected in the same fabric(s), may be determined.

Embodiments may be used, for example, in SAN management systems such as the exemplary centralized SAN management system described below to discover one or more SAN fabrics and map switches to the fabrics from switch information collected from one or more entities such as switch management servers and/or individual switches. The discovered SAN fabric information may then be provided to the SAN management system to be used in various SAN management tasks and/or to be graphically or textually displayed to the user, e.g. on a SAN management console.

Figure 1:
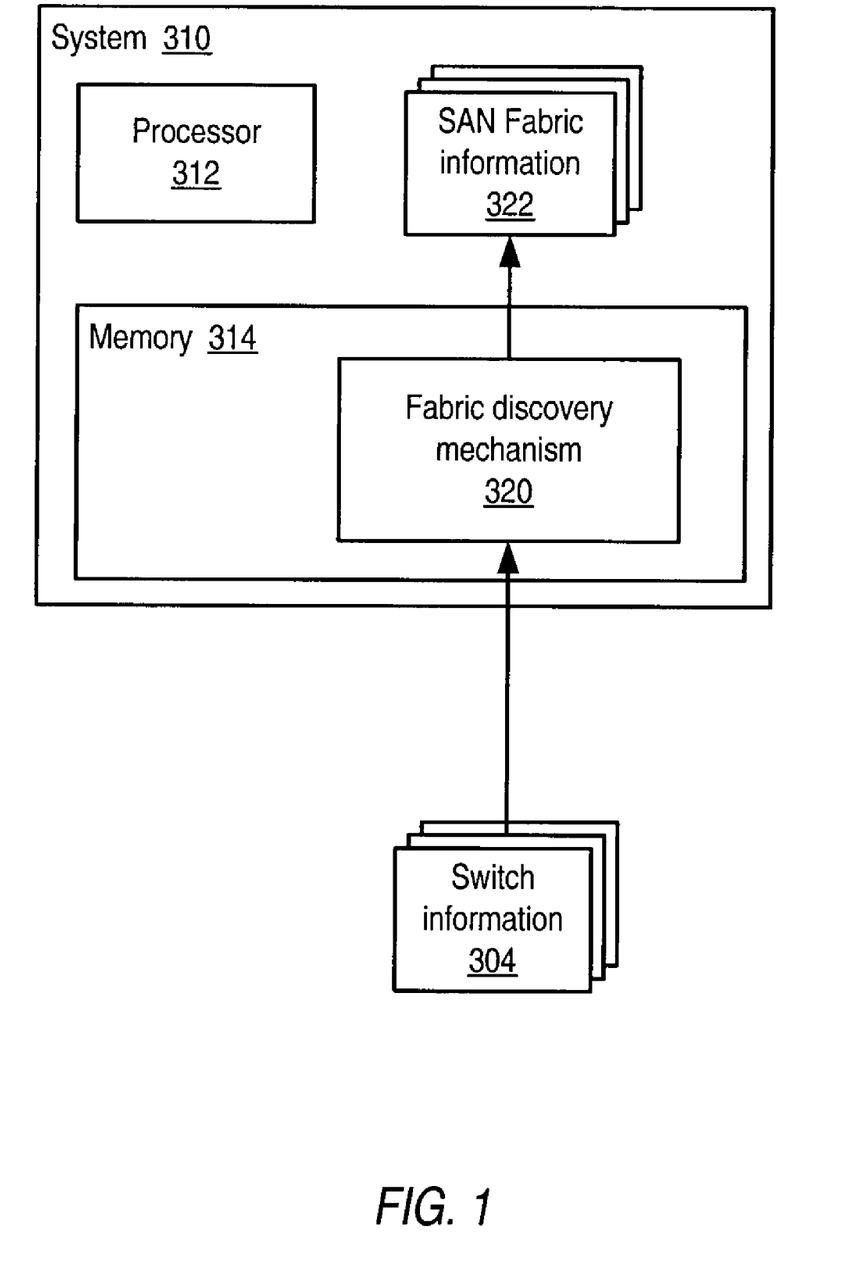
FIG. 1 illustrates a system for discovering SAN fabrics and mapping switches to the fabrics according to one embodiment.

FIG. 1 illustrates a system for discovering SAN fabrics and mapping switches to the fabrics according to one embodiment. System 310 may be any of various types of devices, including, but not limited to, a personal computer system, desktop computer, laptop or notebook computer, mainframe computer system, workstation, network computer, or other suitable device. System 310 may include at least one processor 312. The processor 312 may be coupled to a memory 314. Memory 314 is representative of various types of possible memory media, also referred to as "computer readable media." Hard disk storage, floppy disk storage, removable disk storage, flash memory and random access memory (RAM) are examples of memory media. The terms "memory" and "memory medium" may include an installation medium, e.g., a CD-ROM or floppy disk, a computer system memory such as DRAM, SRAM, EDO RAM, SDRAM, DDR SDRAM, Rambus RAM, etc., or a non-volatile memory such as a magnetic media, e.g., a hard drive or optical storage. The memory medium may include other types of memory as well, or combinations thereof. System 310 may couple over a network to one or more other devices via one or more wired or wireless network interfaces (not shown).

System 310 may include, in memory 314, a fabric discovery mechanism 320 that may be used to discover SAN fabrics and map switches to the fabrics. In one embodiment, fabric discovery mechanism 320 may collect switch information 304 from one or more sources. Fabric discovery mechanism 320 may then traverse the switch information 304 to determine interconnections among the switches. From this information, fabric discovery mechanism 320 may determine one or more SAN fabrics of which the switches are components, map the switches to the appropriate SAN fabrics of which they are components, and generate SAN fabric information 322 describing the fabrics and the switches that are components of the fabrics.

System 310 may also include one or more display devices (not shown) for displaying output of fabric discovery mechanism 320 and/or one or more user input devices (e.g. keyboard, mouse, etc.; not shown) for accepting user input to fabric discovery mechanism 320.

In a SAN fabric, the switches are interconnected, and information on these interconnections may be included in switch information 304. In one embodiment, in traversing the switch information 304 to determine interconnections among the switches, fabric discovery mechanism 320 determines which of a switch's links, if any, are interconnected links (Inter Switch Links (ISLs)) to other switches.

All entities in an FC network have a unique World Wide Name (WWN) that serves as a FC network identifier (ID). Switch information 304 may include WWN information for the switches, including port and node WWNs for each switch. A port WWN is the FC network ID for a particular switch port. A node WWN is the WWN of the node that is connected to a particular switch port. In other words, it is the WWN of the system, storage device/subsystem or other FC network component that is connected to the switch port. Switch information 304 may also include information on Inter-Switch Link (ISL) ports for the switches, including WWN information for the ISL ports. ISL ports may be used to interconnect two or more switches in a fabric. Switch information 304 may include port and node WWNs, with the node WWNs in this case being the WWNs of ISL ports on switches connected to the ISL ports.

In one embodiment, fabric discovery mechanism 320 may traverse the switch information 304 and examine the ISL port information to determine if there is a link from a current switch to another switch, and if so determine the switch's WWN information (which is unique). Fabric discovery mechanism 320 may examine the information on each ISL port of a switch to determine what switch, if any, the ISL port is connected to, and may go from one switch to each of its determined connected switches and examine the ISL port information for those switches to determine if there are switches connected. Thus, fabric discovery mechanism 320 may traverse the switch information 304 for a plurality of switches, at each switch determining from the ISL port information of the switch if there are other switches connected to the switch, until all interconnected switches are traversed to determine interconnection information for the switches. From the determined interconnection information, one or more SAN fabrics including the switches may be determined.

In one embodiment, switch information 304 may be provided in one or more MIBs. In one embodiment, MIBs may include one or more standard SNMP FC MIBs and/or one or more Enterprise MIBs. Fabric discovery mechanism 320 may look up tables in one or more standard SNMP FC MIBs and one or more Enterprise MIBs provided by server 302 and deduce the relationship of the interconnected switches from switch information in the tables.

Fibre Channel may define standard MIBs that FC devices typically, but not necessarily, follow. All devices may not follow the standard exactly. The Fabric Management MIB is one standard by which information about a device may be represented. The Fabric Element MIB is another standard by which a device may represent other information. Many FC devices follow these standards, but may not put information exactly as the standards indicate. The information may be placed in tables, but the information may be organized differently or may mean different things for different devices. Standard SNMP FC MIBs may include a section where vendors can place their own, specific information (referred to as Enterprise MIBs). Enterprise MIBs may be used by vendors to provide information about their particular devices. The vendors may also use the standard MIBs, but may not be able to provide some detailed information through the standard MIBs. The vendors may want to provide other information or, due to differences in their devices, there may be information that does not fit into the standard MIBs.

In one embodiment, all switch information 304 may be gathered from a central SAN fabric management server. Fabric discovery mechanism 320 may communicate with the central SAN fabric management server to obtain all of the necessary switch information. In one embodiment, all necessary switch information may not be available from a central SAN fabric management server. In this embodiment, in addition to communicating with a central SAN fabric management server to get switch information (e.g. MIBs), fabric discovery mechanism 320 may communicate with one or more switches to get additional switch information (e.g. MIBs). One embodiment may communicate just with individual switches to obtain switch information 304. In general, what is communicated with to get the information may depend on a particular implementation.

In one embodiment, to locate switch information, fabric discovery mechanism 320 may examine a list of IP addresses. Some IP addresses may represent individual switches. One or more of the IP addresses may represent central SAN fabric management servers (e.g. McDATA EFCM servers) and thus may actually represent two or more switches, each with its own, unique IF address. For example, an IP address for a McDATA EFCM server may actually represent up to 64 switches managed by the server. Instead of a one-to-one address, where one IP address is one switch, the central SAN fabric management server architecture means that there can be one IP address that may represent multiple switches. Fabric discovery mechanism may then communicate with the located central SAN fabric management server(s) and/or one or more of the located switches through their IP addresses (e.g. out-of-band using SNMP) to access the switch information (e.g. MIBs) of the switches and/or servers.

Figure 2:
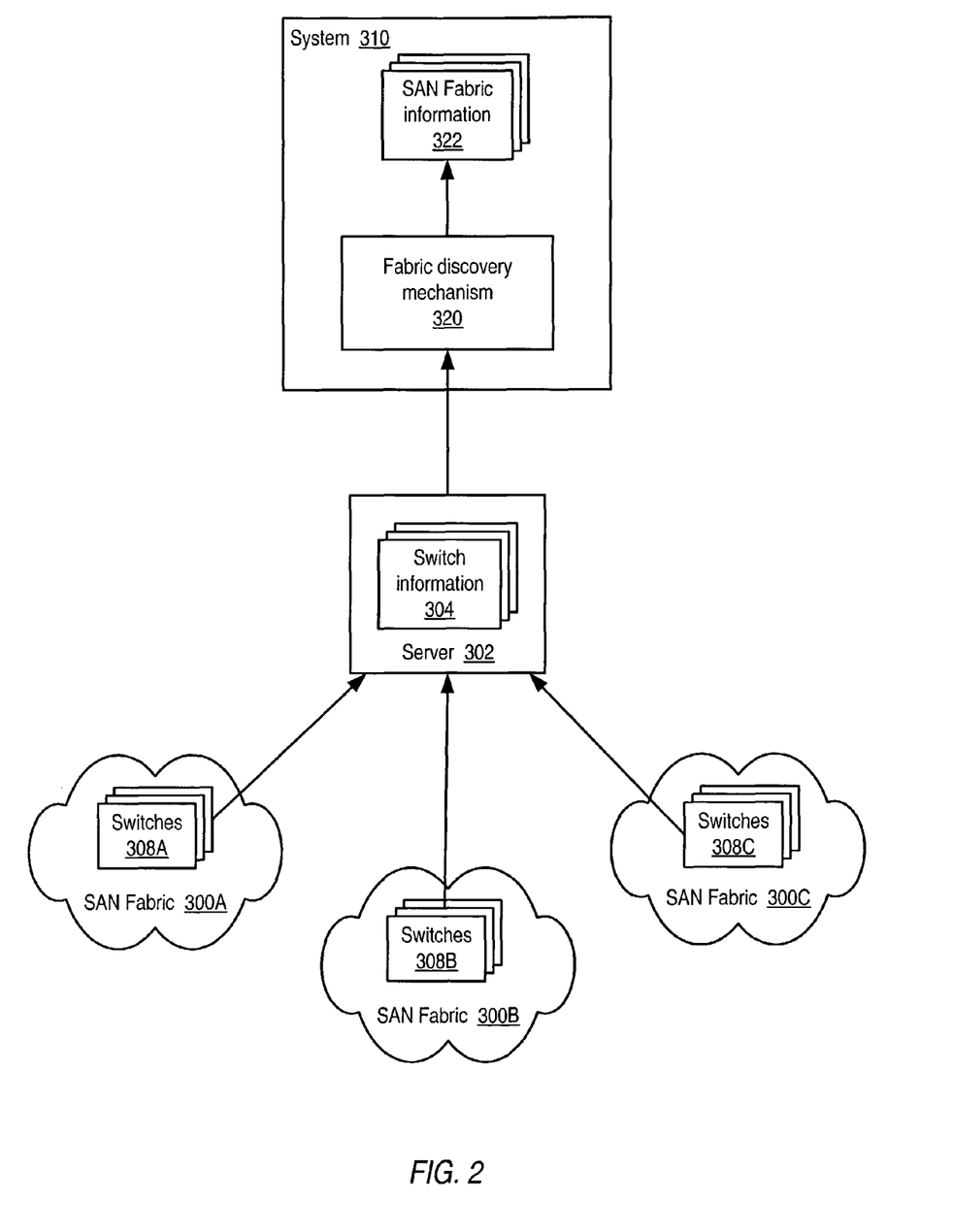
FIG. 2 illustrates a fabric discovery mechanism obtaining switch information from a server according to one embodiment.

FIG. 2 illustrates a fabric discovery mechanism obtaining switch information from a server according to one embodiment. In this embodiment, fabric discovery mechanism 320 may obtain switch information 304 from a central SAN fabric management entity such as server 302. In this embodiment, through communications with the central SAN fabric management entity (server 302), fabric discovery mechanism 320 may identify SAN fabrics 300 managed by server 302 (e.g. fabrics 300A, 300B and 300C) and discover and map switches 308 managed by server 302 to fabrics 300 that the switches 308 are components of. In one embodiment, communications with the SAN fabric management entity may be performed through an out-of-band protocol (e.g. SNMP). In one embodiment, to obtain the switch information 304, fabric discovery mechanism 320 may look up tables in an SNMP Fibre Channel MIB and one or more enterprise MIBs managed by server 302, and then may deduce the relationships of interconnected switches 308 to determine the fabrics(s) 300 from the switch information 304 obtained from the tables.

Server 302 represents a central SAN fabric management server (e.g. McDATA's EFCM) that may include information about switches in a single fabric or a group of fabrics. In one embodiment, fabric discovery mechanism 320 may communicate with server 302 out-of-band (e.g. using SNMP) to obtain switch information 304. Switch information 304 may then be used by fabric discovery mechanism 320 to determine one or more fabrics including the switches, and which switches belong to which fabrics.

Note that, while FIG. 2 shows fabric discovery mechanism 320 and central SAN fabric management server (server 302) as residing on separate systems or devices, in one embodiment fabric discovery mechanism 320 may reside on the same physical device as the central SAN fabric management server.

Figure 3:
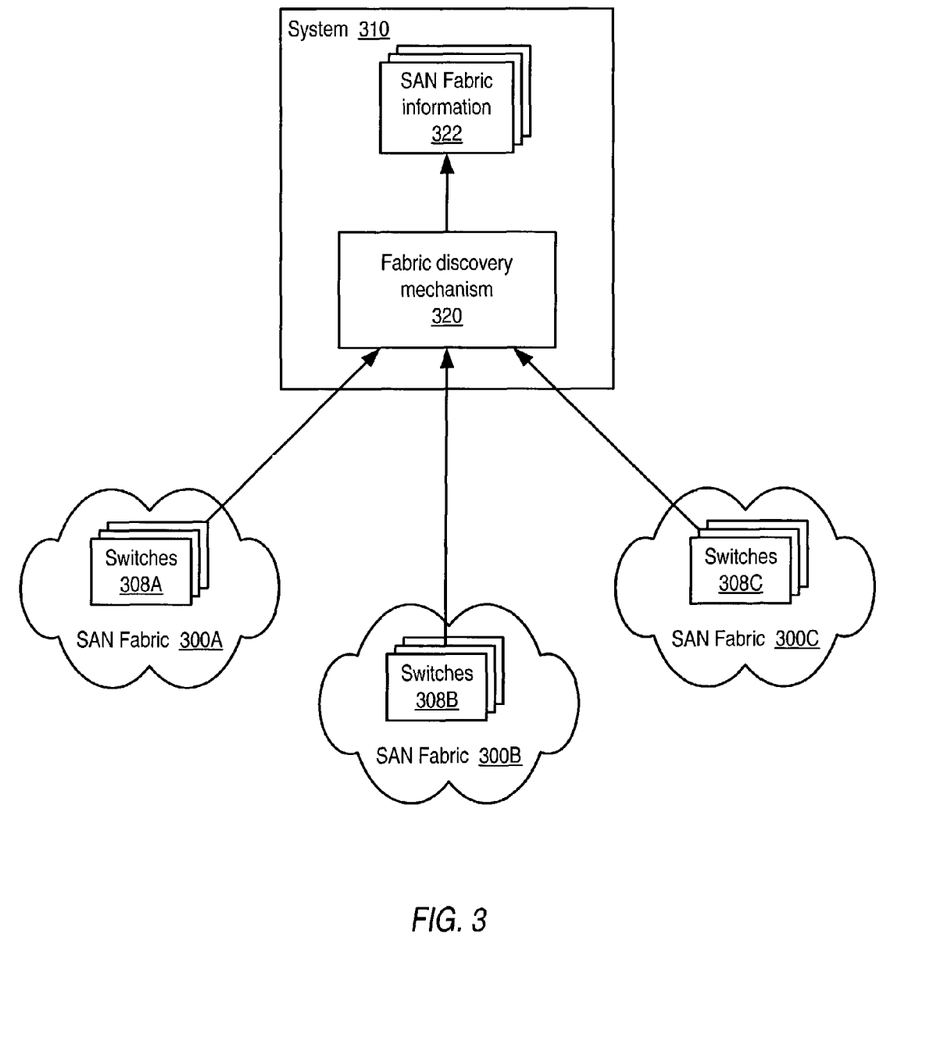
FIG. 3 illustrates a fabric discovery mechanism obtaining switch information from switches according to one embodiment.

FIG. 3 illustrates a fabric discovery mechanism obtaining switch information from switches according to one embodiment. In this embodiment, fabric discovery mechanism 320 may obtain switch information 304 from one or more switches 308 such as switches 308A, 308B and 308C. In this embodiment, through communications with the switches, fabric discovery mechanism 320 may identify SAN fabrics 300 (e.g. fabrics 300A, 300B and 300C) and discover and map switches 308 to fabrics 300 that the switches 308 are components of. In one embodiment, communications with the switches 308 may be performed through an out-of-band protocol (e.g. SNMP). In one embodiment, to obtain the switch information 304, fabric discovery mechanism 320 may look up tables in MIBs provided by the switches 300, and then may deduce the relationships of interconnected switches 308 to determine the fabrics(s) 300 from the switch information 304 obtained from the tables.

Figure 4:
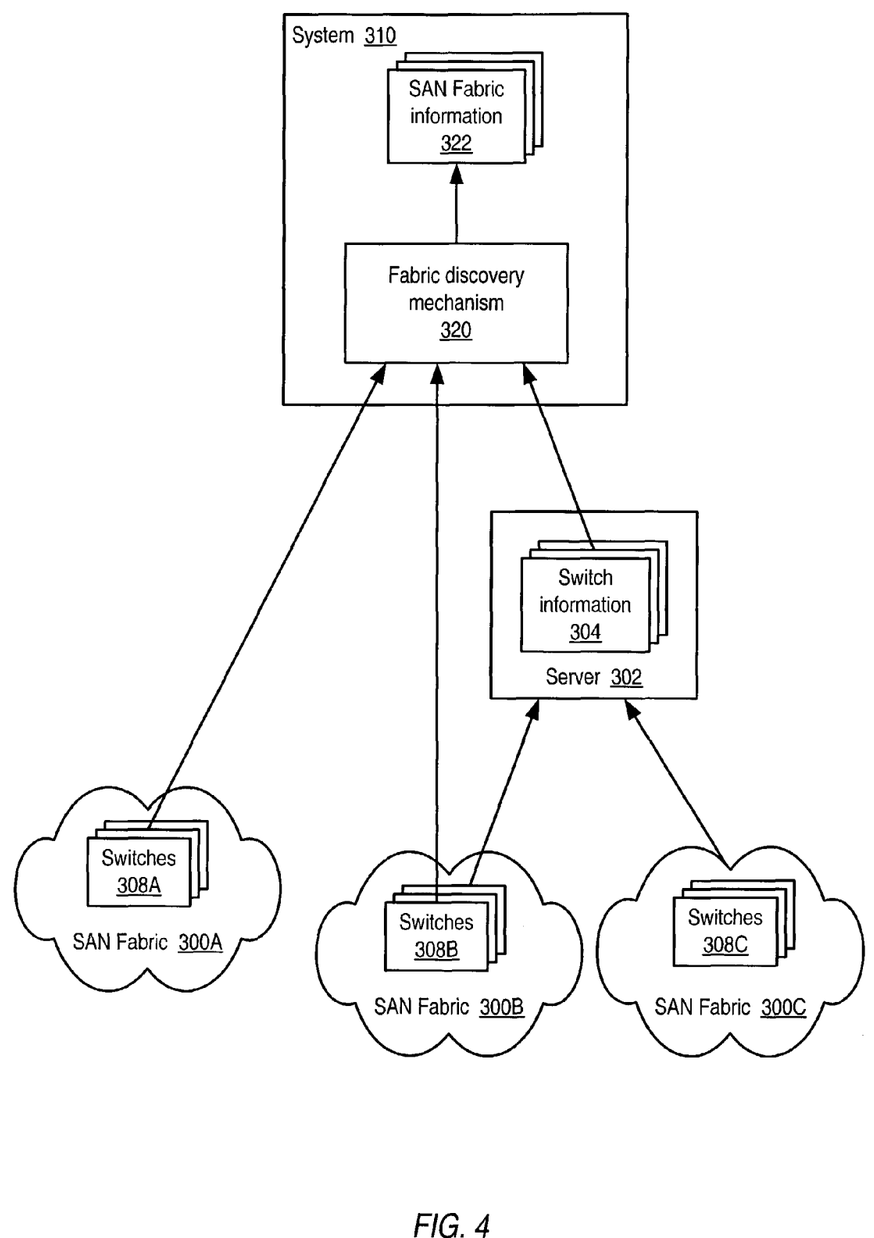
FIG. 4 illustrates a fabric discovery mechanism obtaining switch information from a server and one or more switches according to one embodiment.

FIG. 4 illustrates a fabric discovery mechanism obtaining switch information from a server and one or more switches according to one embodiment. In this embodiment, fabric discovery mechanism 320 may obtain switch information 304 from a central SAN fabric management entity such as server 302 and from one or more switches 308 such as switches 308A and 308B. In this embodiment, through communications with the central SAN fabric management entity (server 302) and one or more switches 308, fabric discovery mechanism 320 may identify SAN fabrics 300 (e.g. fabrics 300A, 300B and 300C) and discover and map switches 308 to fabrics 300 that the switches 308 are components of. In one embodiment, communications with the SAN fabric management entity and switches 308 may be performed through an out-of-band protocol (e.g. SNMP). In one embodiment, to obtain the switch information 304, fabric discovery mechanism 320 may look up tables in an SNMP Fibre Channel MIB and one or more enterprise MIBs managed by server 302, as well as tables in one or more MIBs provided by switches 308, and then may deduce the relationships of interconnected switches 308 to determine the fabrics(s) 300 from the switch information 304 obtained from the tables. Note that, in one embodiment as illustrated for SAN fabric 300B in FIG. 4, fabric discovery mechanism 320 may obtain some information for switches 308B directly from the switches and other information for switches 308B from the server information 304 on server 302.

A switch management server (server 302) may only provide information about the switches it sees. In one embodiment, a switch management server may only provide information about the principle switches of fabrics. The switch management server does not directly provide information on fabrics, how each switch is connected, or which switches belong to which fabric. Fabric discovery mechanism 320 may obtain information on all the switches that the switch management server knows about, and then go to each of theses switches to determine the switch's remote (ISL) ports and to determine which switches are attached to the remote ports, if any. Fabric discovery mechanism 320 may then go to each of the switches that were determined to be connected to the switches "known" by the switch management server to access switch information (e.g. MIBs) of the switches and repeat the process to determine switches connected to those switches. When all switches that can be reached have been traversed, one or more fabrics including the switches may be deduced from compiled interconnection information on the traversed switches, and which switches belong to which fabrics may be determined.

Figure 5:
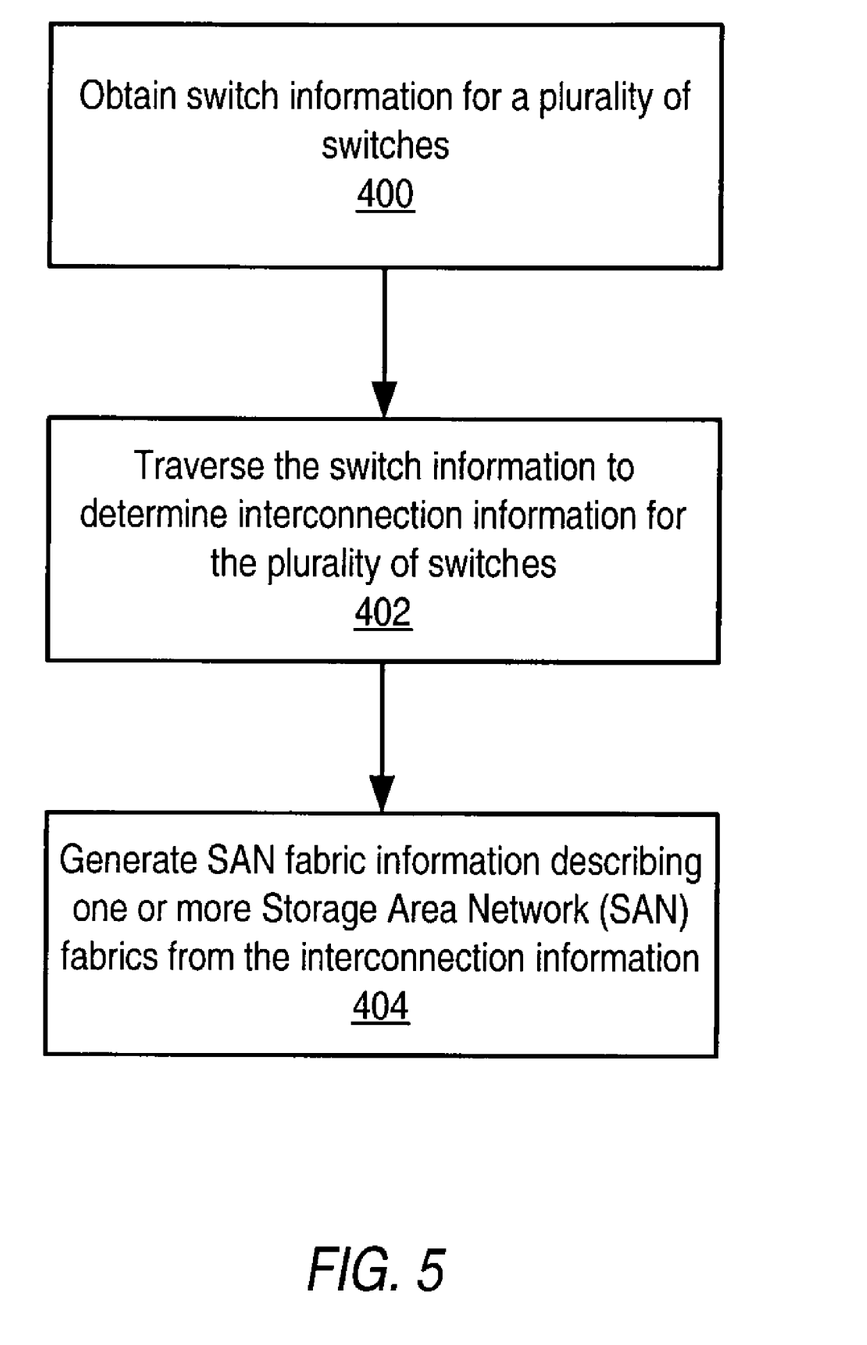
FIG. 5 is a flowchart illustrating discovering SAN fabrics and mapping switches to the fabrics according to one embodiment.

FIG. 5 is a flowchart illustrating discovering SAN fabrics and mapping switches to the fabrics according to one embodiment. As indicated at 400, switch information may be obtained for a plurality of switches. In one embodiment, the switch information may be obtained from a central switch server. In one embodiment, the switch information may be obtained directly from the switches. In one embodiment, portions of the switch information may be obtained both from the central switch server and from one or more switches. In one embodiment, the switch information may be obtained from one or more management information bases (MIBs). In one embodiment, these MIBs may include a standard Simple Network Management Protocol (SNMP) FC MIB and one or more Enterprise MIBs. In one embodiment, the switch information may be obtained over a network separate from the SAN fabrics, e.g. using the SNMP protocol, though one or more other protocols may be used.

The obtained switch information may then be traversed to determine interconnection information for the plurality of switches as indicated at 402. In one embodiment, in traversing the switch information, ISL port information may be examined to determine if there is a link from a current switch to another switch, and if so determine the switch's WWN information. The information on each ISL port of a switch may be examined to determine what switch, if any, the ISL port is connected to, and the traversal mechanism may then go from the current switch to each of its determined connected switches to examine the ISL port information for those switches to determine if there are switches connected. Thus, the switch information for a plurality of switches may be traversed, at each switch determining from the ISL port information of the switch if there are other switches connected to the switch, until all interconnected switches are traversed to determine interconnection information for the switches. From the interconnection information generated during the traversal, one or more SAN fabrics each comprising one or more of the switches may be determined, and SAN fabric information describing the one or more SAN fabrics may be generated, as indicated at 404. This information may be displayed in graphical and/or textual format, and/or provided to one or more other SAN management entities for use in managing SAN fabrics and/or display.

Figure 6:
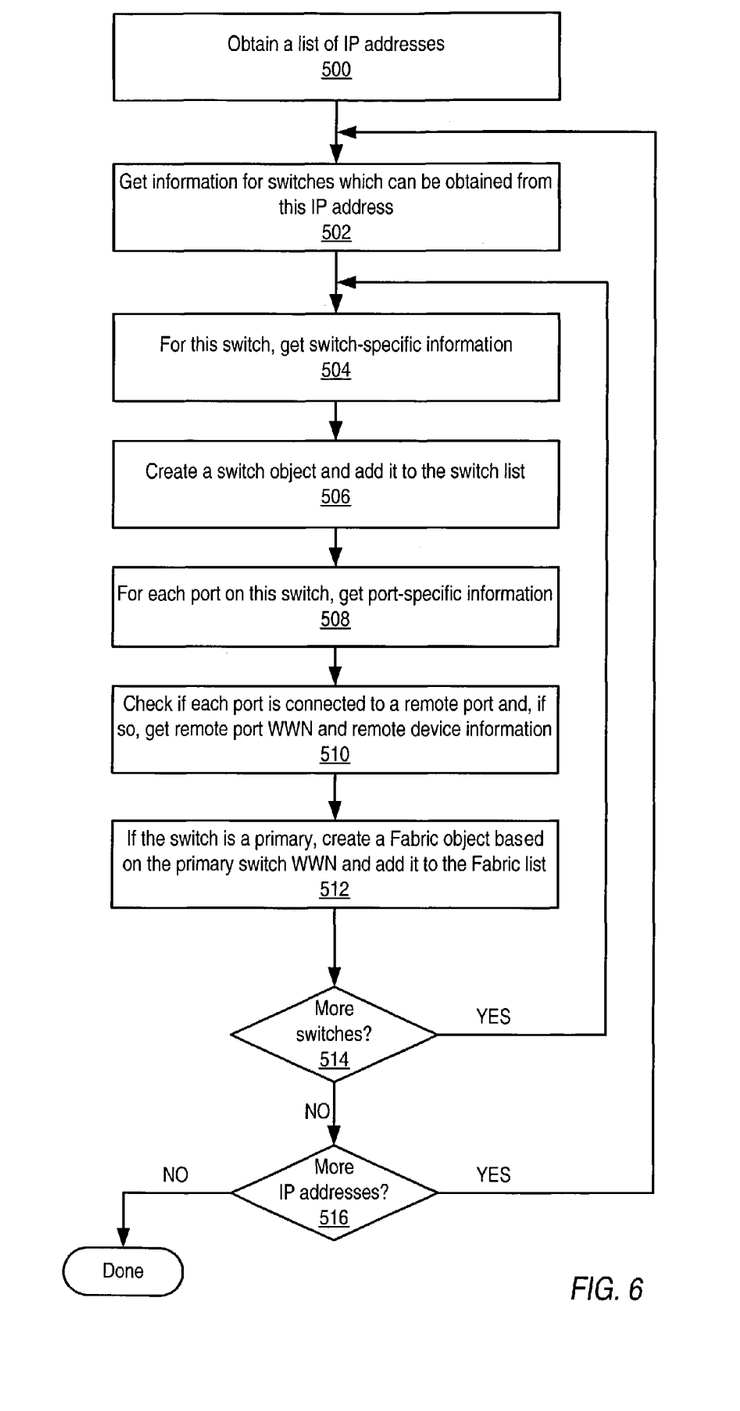
FIG. 6 illustrates a method of discovering switches and fabrics according to one embodiment.

FIG. 6 illustrates a method of discovering switches and fabrics according to one embodiment. The method described in FIG. 6 represents means for obtaining switch information for a plurality of switches and means for traversing the switch information to determine interconnection information for the plurality of switches according to one embodiment.

As indicated at 500, a list of IP addresses may be obtained. In one embodiment, the IP addresses may be obtained from a SAN management system such as the exemplary SAN management system described herein. 502-514 may then be performed for each IP address. As indicated at 502, switch information for one or more switches available from the current IP address may be obtained. 504-512 may then be performed for each switch for which information was obtained.

As indicated at 504, for a current switch, switch-specific information including one or more of, but not limited to, vendor, model, switch serial number, switch WWN, switch role (primary/non-primary), and number of ports on this switch may be obtained. As indicated at 506, a switch object may be generated for this switch, including at least part of the obtained switch-specific information, and added to a list of switch objects.

508 and 510 may be performed for each port of the current switch. As indicated at 508, for each port on the current switch, port specific information may be obtained including one or more of, but not limited to, port WWN, port type, and port state. As indicated at 510, a check may be performed to determine if the port is connected to a remote port. If the port is connected to a remote port, get the remote port WWN and remote device information.

As indicated at 512, If the switch is determined to be a primary switch, a fabric object is generated based on the primary switch WWN and added to the Fabric list. At 514, if there are more switches, return to 504 and perform 504-512 for the next switch. At 516, if there are more IP addresses, return to 502 and perform 502-514 for the next IP address.

After completing the method illustrated in FIG. 6, all of the switches and their ports, and the port's remote connection information, has been collected. The primary component of each fabric (the primary switch) has also been determined and recorded. In one embodiment, as illustrated in FIG. 7, this may be done using a recursive, depth-first search of remote connectivity of remote ports of a switch port starting with the primary switch.

Figure 7:
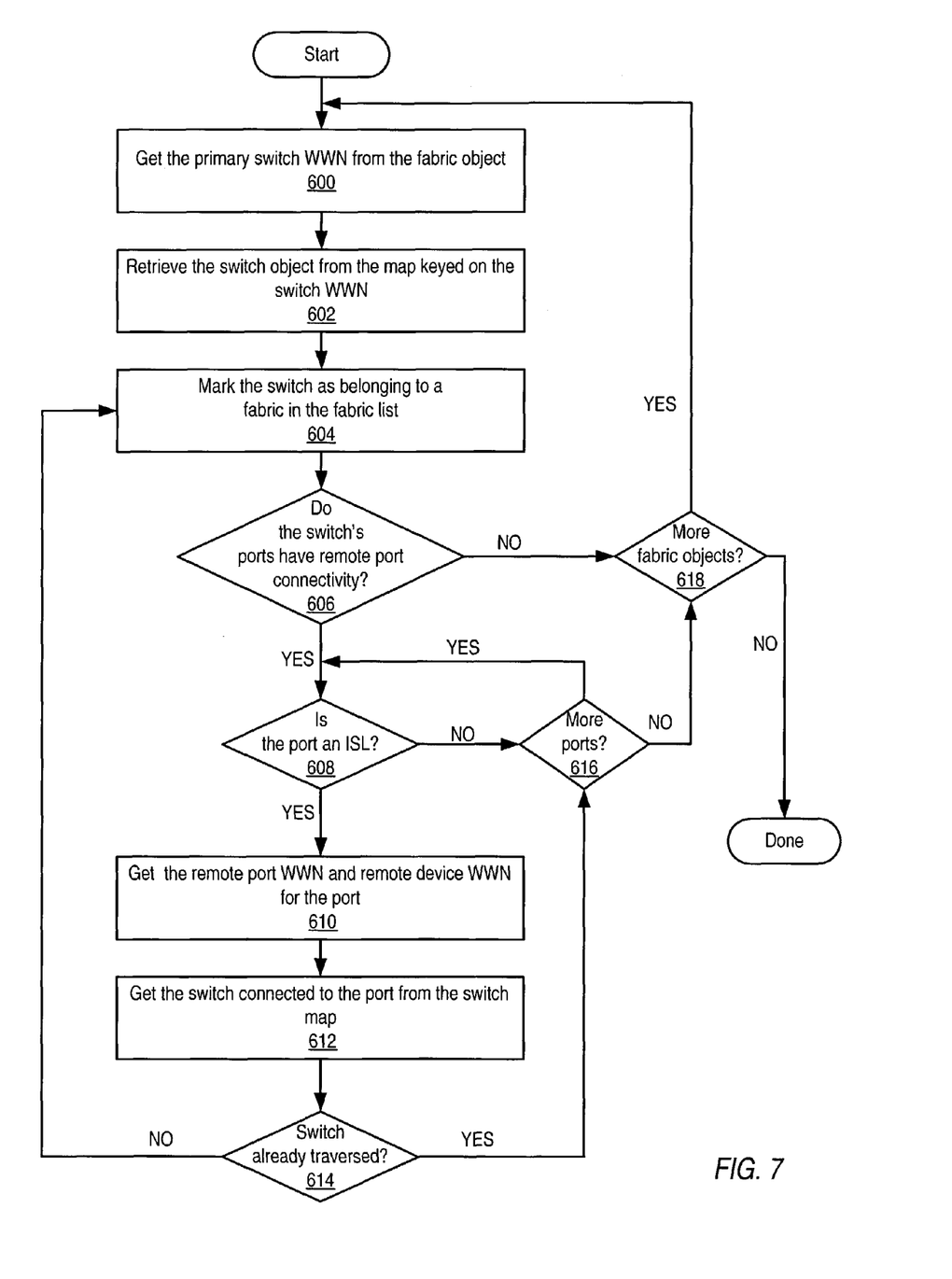
FIG. 7 is a flowchart of a method for determining connectivity between switches and associating switches to correct fabrics according to one embodiment.

FIG. 7 is a flowchart of a method for determining connectivity between switches and associating switches to correct fabrics according to one embodiment. The method described in FIG. 7 may be performed for every fabric object (primary switch WWN) in the list of fabrics generated by a method such as that illustrated in FIG. 6. The method described in FIG. 7 represents means for generating SAN fabric information describing one or more Storage Area Network (SAN) fabrics each comprising one or more of the plurality of switches from determined interconnection information according to one embodiment.

As indicated at 600, the primary switch WWM may be obtained from the current fabric object. As indicated at 602, the switch object may be retrieved from the map of switch objects, keyed on the switch WWN. As indicated at 604, the switch is marked as belonging to the fabric indicated by the current fabric object in the fabric list. In one embodiment, this may include indicating the switch as a component of the fabric in the current fabric object. In one embodiment, this may include indicating the switch as a component of the fabric in the switch object representing the switch. As indicated at 606, a check may be performed to determine if the switch's ports have remote port connectivity. If the switch's ports do not have remote port connectivity, and if there are more fabric objects as indicated at 618, the method may return to 600 to process the next fabric object. If the switch has remote connectivity, 608-614 may be performed for each port in the port list of the switch object.

As indicated at 608, the information stored for the port may be examined to determine if the port is an ISL (Inter-Switch Link) port. If the port is not an ISL port, and there are more ports as indicated at 616, then the next port may be examined. If there are no more ports, and if there are more fabric objects as indicated at 618, the method may return to 600 to process the next fabric object. If the port is an ISL port, the remote port WWN and remote device (Node) WWN is obtained for the port as indicated at 610.

The remote device (Node) WWN of the remote port is a switch WWN. As indicated at 612, the switch is obtained from the switch map keyed off this WWN. If this switch has already been traversed as indicate at 614, then this fabric is known, and the method goes to 616 to determine if there are more ports. If the fabric is not yet known for this remote switch, the method returns to 604.

SAN Management System

Figure 8:
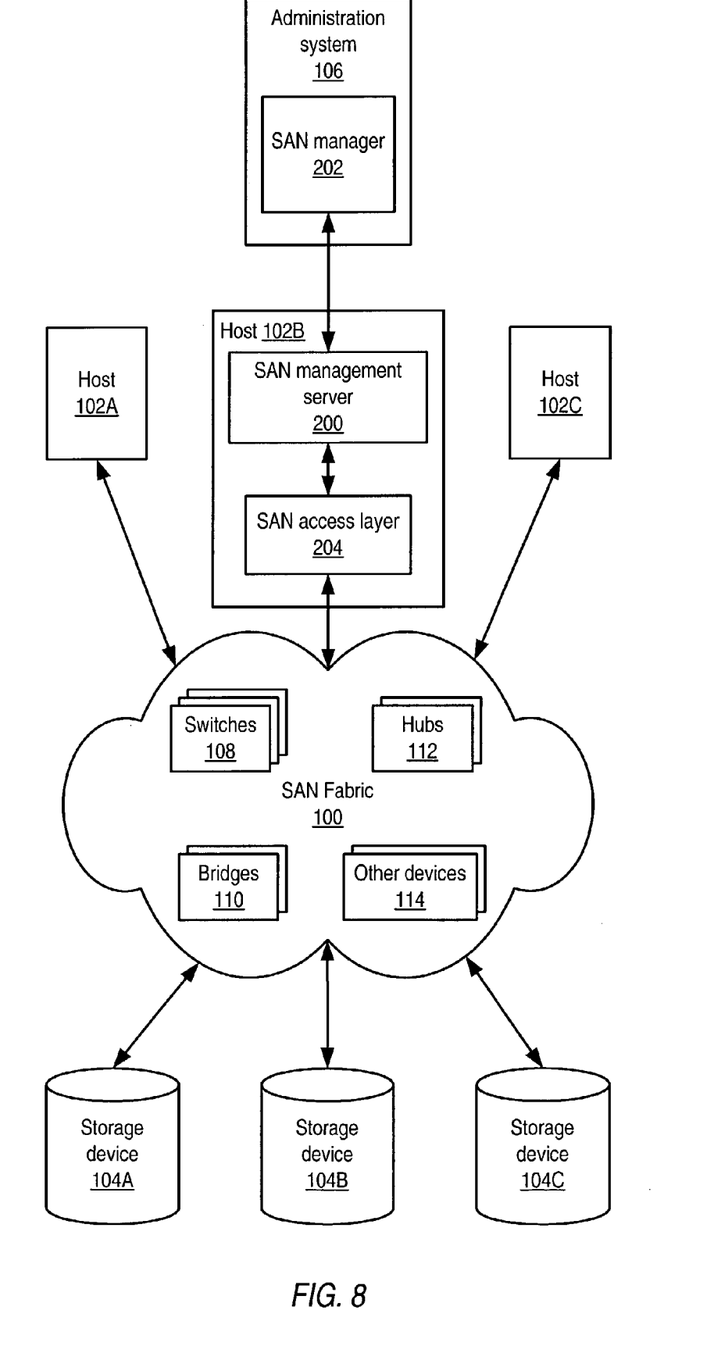
FIG. 8 shows an exemplary SAN implementing an embodiment of a SAN management system.

Embodiments of a centralized Storage Area Network (SAN) management system in which embodiments of the fabric discovery mechanism for discovering Storage Area Network (SAN) fabrics and mapping switches to the fabrics may be used are described. FIG. 8 shows an exemplary SAN implementing an embodiment of the SAN management system. For one embodiment, SAN may be described as a high-speed, special-purpose network that interconnects storage devices 104 (e.g. storage devices 104A, 104B, and 104C) with associated data servers (e.g. hosts 102A, 102B, and 102C) on behalf of a larger network of users. A SAN may employ Fibre Channel technology. A SAN may include one or more hosts 102 (e.g. hosts 102A, 102B, and 102C), one or more storage devices 104 (e.g. storage devices 104A, 104B, and 104C), and one or more SAN fabrics 100. A SAN may also include one or more administration systems 106. One or more end-user platforms (not shown) may access the SAN, typically via a LAN or WAN connection to one or more of the hosts 102.

Storage devices 104 may include, but are not limited to, RAID (Redundant Array of Independent Disks) systems, disk arrays, JBODs (Just a Bunch Of Disks, used to refer to disks that are not configured according to RAID), tape devices, and optical storage devices. Hosts 102 may run any of a variety of operating systems, including, but not limited to: Solaris 2.6, 7, 8, 9, etc.; Linux; AIX; HP-UX 11.0b, 11i, etc.; Microsoft Windows NT 4.0 (Server and Enterprise Server) and Microsoft Windows 2000 (Server, Advanced Server and Datacenter Editions). Each host 102 is typically connected to the fabric 100 via one or more Host Bus Adapters (HBAs). SAN fabric 100 may enable server-to-storage device connectivity through Fibre Channel switching technology. SAN fabric 100 hardware may include one or more switches 108, bridges 110, hubs 112, or other devices 114 such as routers, as well as the interconnecting cables (for Fibre Channel SANs, fibre optic cables).

Embodiments may simplify and centralize the management of heterogeneous SANs to enable control of SAN resources including, but not limited to, logical volumes, fibre channel adapters, and switches 108, as well as storage devices 104. Embodiments may provide centralized management of SAN-connected devices with automatic discovery, visualization, access control, and policy-based monitoring, alerting and reporting. Embodiments may provide a single point of management from logical unit to interconnect to SAN-connected hosts 102. Embodiments may provide data-centric management from host applications through interconnects to the storage resources, regardless of the underlying hardware and operating system(s). SAN management may occur at physical and logical levels to maintain control regardless of the underlying device environment. With the discovery of host attributes like OS platform, OS handles and IP address, the critical link associating logical devices to a host 102 and its applications may be made.

one embodiment may be based on distributed client-server architecture, and may be divided into components that may include one or more SAN managers 202, a SAN management server 200, and a SAN access layer 204. In one embodiment, the SAN access layer may be a component of the SAN management server 200.

SAN management server 200 may discover SAN objects and their attributes, and may provide event management, policy management, and/or notification services. SAN management server 200 may explore the SAN to make data available to client applications, including SAN manager 202. SAN management server 200 may run in a variety of operating systems including, but not limited to: Solaris 2.6, 7, 8, 9, etc.; Linux; AIX; HP-UX 11.0b, 11i, etc.; Microsoft Windows NT 4.0 (Server and Enterprise Server) and Microsoft Windows 2000 (Server, Advanced Server and Datacenter Editions). One embodiment may include an integrated volume manager that may provide capabilities including, but not limited to, pooling storage across multiple heterogeneous arrays on the SAN. The SAN management system may automatically discover and display volumes within its interface. Additionally, adding storage to a host may be streamlined though the SAN management system.

Embodiments may reduce or eliminate the manual task of tracking of devices and their connections in the SAN by automatically discovering the physical and logical connections of the SAN, displaying the information in a graphical topology map and logging the data in a variety of inventory reports. One embodiment may enable the automatic discovery of SAN resources using one or more in-band and/or out-of-band protocols and industry standards (e.g. MS/CT, GS-3, SNMP, Fibre Alliance MIB, ANSI T11, SCSI, CIM (Common Information Model), vendor-specific extensions, etc.). Using both in-band and out-of-band protocols, and leveraging industry standards, the SAN management system may automatically capture and display details, including, but not limited to, device driver version, firmware level, status, performance, free and in-use port count, hardware manufacturer, model number and worldwide name (WWN). In-band refers to transmission of a protocol other than the primary data protocol over the same medium (e.g. Fibre Channel) as the primary data protocol. Out-of-band refers to transmission of management information for Fibre Channel components outside of the Fibre Channel network, typically over Ethernet, and for example using the SNMP protocol.

By discovering objects and the relationship of these objects to each other, SAN access layer 204 may maintain a real-time topology of the SAN. SAN access layer 204 may also directly interface with switches on one or more fabrics to manage the zoning of storage resources. SAN access layer 204 may discover additional information about objects on the SAN that SAN management server 200 cannot discover directly, such as devices on a separate zone or fabric 100.

In one embodiment, SAN access layer 204 may perform functions that may include, but are not limited to, coordinating the activity of explorers, managing changes to a data store, and performing zoning operations by communicating with switches on fabric 100. In one embodiment, SAN access layer 204 may include one or more explorers that provide an interface to different types of heterogeneous SAN components so that the SAN management system may provide a common data representation for heterogeneous SAN components. Explorers may communicate with the SAN components over Fibre Channel (in-band) and/or Ethernet (out-of-band) connections to inventory the SAN. Each explorer may communicate with a specific type of device using a protocol available for that specific type of device. Explorers may include one or more of, but are not limited to, in-band and/or out-of-band switch explorers, zoning explorers, disk array explorers, and Host Bus Adapter (HBA) explorers.

Once the SAN is discovered, SAN access layer 204 may continue to monitor the SAN and may update a data store as new events occur on the SAN. In one embodiment, SAN access layer 204 may periodically examine the SAN, for example to discover or determine objects that are added, objects that are removed, and connections that are pulled. In one embodiment, data gathered by the explorers may be aggregated into a data store, which may be updated with real-time information about objects on the SAN.

In one embodiment, SAN access layer 204 may automatically discover information for each Addressable Unit (LUN) that is under the control of a volume manager. In one embodiment, SAN management server 200 may discover information about HBAs on other hosts 102 attached to fabrics 100 discovered by SAN management server host 102A.

In one embodiment, data generated by SAN access layer 204 may be in a format (e.g. XML) that may be read by a Web browser or exported to a file that may be opened and edited using a standard text editor. In one embodiment, a SAN's current state may be captured in a file, e.g. an XML or other markup language file. Thus, snapshots of the SAN may be saved over time, which may be analyzed and compared to current conditions on the "live" SAN.

One embodiment may include a SAN access layer remote (not shown) that may be installed on one or more other hosts 102 in the SAN, if any, to assist SAN management server 200 in discovering the entire SAN. In one embodiment, each installation of a SAN access layer remote may include one or more explorers that may also be used by SAN access layer 204. Each installation of the SAN access layer remote may provide information gathered by the explorers to SAN access layer 204, which may aggregate this information into a data store. In one embodiment, if SAN access layer remote 230 is not installed on a host 102, SAN management server 200 may still discover the HBA, and the enclosure utility may be used to accurately visualize the host in SAN manager 202's user interface.

SAN manager 202 may provide a central management interface for various SAN management tasks, and may provide a graphical user interface for displaying the information (e.g. XML data) compiled by and received from SAN management server 200 in graphical and/or textual format, and may provide a user interface for accessing various features of the SAN management system such as tools and utilities. SAN manager 202 may run on any of a variety of end-user platforms coupled to one or more of the hosts 102, typically via a LAN or WAN, or alternatively may run on one of the hosts 102, including the host 102 that includes SAN management server 200. One embodiment may provide in-context launch support for element managers supplied by device vendors to provide vendor-specific management. In one embodiment, SAN manager 202 may be a client of SAN access layer 204, and may graphically and/or textually display objects discovered by SAN access layer 204.

Embodiments may provide customizable, intuitive views into a SAN based on host 102, device, fabric 100, or storage groups, as well as real-time alerts to diagnose and avoid outages. In one embodiment, SAN manager 202 may serve as a centralized point from which a user may view information about a SAN, including, but not limited to, information about the SAN's topology and heterogeneous components. In one embodiment, SAN manager 202 may facilitate SAN management by allowing the user to graphically drill down into the logical and physical devices on the SAN. Information on SAN devices may be displayed in context in the GUI, revealing resources in zones as they are physically and logically connected.

One embodiment may provide a real-time alert viewer that may monitor heterogeneous device status, and may provide proactive management capabilities in the SAN environment. Through policies, the status and performance of the device(s) may be monitored, and alerts may be generated when behavior falls outside acceptable boundaries. Embodiments may enable intelligent monitoring through user-definable threshold levels, and may perform actions automatically as well as notify administrators of critical events in real time.

Embodiments may provide both real-time and historical performance data for critical service-level parameters such as connectivity, available space and throughput. One embodiment may enable real-time performance charting of SAN devices. Embodiments may monitor interconnect and storage devices in real time, and may be used to display information about the various SAN devices such as current load/status. Through real-time performance monitoring, with flexible user-defined thresholds, one embodiment may notify administrators about issues that could affect overall SAN performance before the issues have an impact.

One embodiment may include a SAN reporter that enables the user to generate and view reports on details of the SAN. Embodiments may provide both real-time and historical performance data for critical service-level parameters such as connectivity, available space and throughput. In one embodiment, the SAN management server may collect real-time and/or historical SAN data that may be provided to the SAN reporter for use in generating SAN performance reports.

In one embodiment, policy-based management may enable the monitoring of conditions on a SAN and may facilitate quick response when problems occur. Embodiments may use one or more methods for monitoring conditions on a SAN. These methods may include, but are not limited to, out-of-band polling (e.g. SNMP polling), traps (e.g. SNMP traps) and SAN access layer 204, and in-band, e.g. using the Fibre Channel Common Transport (CT) protocol. SAN access layer 204 may provide notification of SAN events such as the addition or deletion of SAN components.

One embodiment may include collectors, paths or channels through which a specific type of data is gathered for a specific object type. Collectors may include one or more of, but are not limited to, collectors for object availability, environmental conditions, device errors, and SAN traffic. Collectors may monitor properties such as switch port status, dropped frames, disk temperature, link failures, etc., which may be evaluated by a policy service to create a composite status of the SAN. In one embodiment, these collectors may be based on devices' SNMP MTB variables. One embodiment may include one collector per data type per object, for each object that can be monitored. In one embodiment, each collector may be associated with an object type, such as a SAN host 102 or a switch port. In one embodiment, each collector may be associated with a type of data, for example textual state or numeric threshold data.

One embodiment may include a policy service that manages policies associated with objects on the SAN. Policies may be rules used to help manage a SAN by automating responses to certain events and conditions. Policies may detect when something goes wrong, and may be used to anticipate and handle problems before they occur. A policy may indicate a particular object or type of object to monitor. In general, any object for which at least one collector is provided may be monitored. A policy may include a description of a condition to monitor on an object, such as a high percentage of bandwidth utilization on a switch port, and a set of actions to take when that condition is met. In one embodiment, a policy service may be integrated with SAN manager 202, permitting users to view what policies are in effect on their SAN, define and modify policies, and generate reports based on the monitored conditions.

One embodiment may include a policy engine that performs the instructions described in all policies enabled on the SAN. In one embodiment, the policy engine may be a component or process of a policy service. When the objects on the SAN are discovered, collectors corresponding to the objects may be determined and the relevant collectors may be registered with the policy engine. The policy engine then may receive a stream or streams of real-time collector data and compare data values with the conditions described in its policies. When the alarm condition for a particular policy is met, the policy engine performs the actions described in the policy. An alarm is an internal signal used by the SAN management system. An alarm is generated by a policy when the condition specified in the policy is detected or evaluated as true. An alert to SAN manager 202 is a configurable response that may result from an alarm. One embodiment may include an alarm service that may monitor and collect status and performance information from the SAN using both out-of-band (e.g., SNMP) and SAN access layer 204 events. This collector information may be fed into a policy service to trigger policy actions and for logging for reporting purposes. In one embodiment, data collected by the alarm service may be logged in a database.

The conditions available for a policy may be determined by the type of object being monitored. Different types of policy conditions may result in different types of alarms. There may be different types of conditions for various objects managed by SAN management server 200, for example threshold condition with action policies that may be used to monitor objects and detect when particular numeric thresholds are reached and sustained for a configurable period, and text comparison condition with action policies that may be used to evaluate textual states to determine the status or condition of SAN resources.

For every policy, one or more actions to be taken when the specified condition is detected may be configured. Actions may, for example, perform corrective and/or notification functions. Policy actions may include one or more of, but are not limited to, console alerts, which may send an alert to SAN manager 202 when a specified condition is detected, commands or scripts (e.g., a PERL script) that execute a command or executable file specified for the action, e-mail notification to one or more specified recipients, traps (e.g. SNMP traps) as notifications to applications, paging and Instant Messaging. In one embodiment, specific hardware alerts may be forwarded to alert on the applications that will be affected by the hardware problems. In one embodiment application alerts and/or hardware alerts may be forwarded to create alerts for specific departments to preferably provide a top-down alert hierarchy.

In one embodiment, SAN manager 202 may serve as a centralized point from which a SAN administrator or other user may create and manage groups of SAN objects, including groups of heterogeneous components. One embodiment may provide a group utility for creating and managing logical groups of SAN objects including hosts 102, storage device 104 interconnects, other groups, and other objects that may be members of a group. A group may be defined as an arbitrary set of SAN elements defined by an administrator to help organize and provision resources, and may be implemented by storage administrators to identify and manually provision available storage devices 104 that match the quality of service requirements of particular user groups or applications. One embodiment may support one or more types of groups, including, but not limited to, generic groups, storage accounts, and storage groups.

One embodiment may support the zoning of objects on the SAN including, but not limited to, switch ports, hosts 102, and storage devices 104 to control host 102 access to storage resources. One embodiment may provide methods to enforce the access restrictions created by zones on the SAN. These may include methods that correspond to the forms of zoning commonly referred to as soft zoning and hard zoning. One embodiment may support switch zoning though application program interfaces (APIs) provided by switch vendors, allowing for both hard and soft zoning. In one embodiment, SAN manager 202 may serve as a centralized point from which a user may access SAN management system and/or third-party services, tools, applications, and/or utilities to create and manage zones on the SAN, including zones containing heterogeneous SAN objects. One embodiment may use a switch-neutral approach to zoning. One embodiment may provide a zone utility that may facilitate the creation, modification, and deletion of zones. The zone utility may be used to administer zones directly and visually; and may reduce or remove the need to use telnet commands or proprietary, hardware-specific Web-based solutions for zoning.

One embodiment may provide a LUN security utility as a central point from which to perform LUN security operations including LUN binding, LUN masking, and fabric zoning. In one embodiment, the LUN security utility may provide granular control over host 102 access to individual LUNs within an array or other collection of potentially heterogeneous storage devices. In one embodiment, the LUN security utility may guide the user through configuring LUN security operations and allow the user to execute the configured LUN security operations with a single operation, for example, a single click of a button in the user interface. One embodiment may provide a LUN query tool that may be used to search for and find LUNs on the SAN that match one or more properties, such as device vendor, storage type, capacity, configuration, cost, and location.

CONCLUSION

Various embodiments may further include receiving, sending or storing instructions and/or data implemented in accordance with the foregoing description upon a carrier medium. Generally speaking, a carrier medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A computer-implemented method, comprising:
   obtaining, on a computer device, switch information for a plurality of switches, wherein at least a portion of the switch information is obtained from a server that maintains switch information about switches in two or more distinct Storage Area Network (SAN) fabrics;
   traversing the obtained switch information to determine interconnection information for the plurality of switches, wherein the interconnection information includes information about how each of the plurality of switches is connected to other devices, and wherein said traversing comprises determining which of the plurality of switches are in each distinct SAN fabric and how each of the plurality of switches is connected to other devices in its respective SAN fabric; and
   generating SAN fabric information describing a plurality of distinct SAN fabrics each comprising one or more of the plurality of switches from the determined interconnection information, wherein the SAN fabric information includes information indicating which of the plurality of switches are in each distinct SAN fabric and how each of the plurality of switches is connected to other devices in its respective SAN fabric; and
   displaying at least a portion of the SAN fabric information on a display device.

2. The computer-implemented method as recited in claim 1, wherein at least a portion of the switch information is obtained from the switches.

3. The computer-implemented method as recited in claim 1, wherein at least a portion of the switch information is obtained over a network separate from the SAN fabrics.

4. The computer-implemented method as recited in claim 1, wherein said obtaining switch information for a plurality of switches comprises:
   obtaining one or more IP addresses; and
   obtaining the switch information from SAN components indicated by the IP addresses.

5. The computer-implemented method as recited in claim 1, wherein said traversing the switch information to determine interconnection information for the plurality of switches comprises, for each switch for which there is switch information:
   generating a switch object for the switch;
   inserting the switch object in a map of switch objects according to the switch's interconnection with others of the switches;
   if the switch is a primary switch of a SAN fabric, generating a fabric object representing the SAN fabric and adding the fabric object to a list of fabric objects each representing a SAN fabric; and
   for each port of the switch, if the port is connected to another switch, obtaining switch information for the connected switch and adding the switch information for the connected switch to the obtained switch information for the plurality of switches.

6. The computer-implemented method as recited in claim 5, wherein said generating SAN fabric information describing a plurality of distinct SAN fabrics each comprising one or more of the plurality of switches from the determined interconnection information comprises, for each fabric object in the list of fabric objects:
   getting a switch object representing the primary switch of the SAN fabric represented by the fabric object from the map of switch objects;
   indicating in the fabric object that the primary switch is a component of the SAN fabric represented by the fabric object; and
   for each switch interconnected with the primary switch according to the map of switch objects, indicating in the fabric object that the interconnected switch is a component of the SAN fabric represented by the fabric object.

7. A system, comprising:
   a processor; and
   a memory comprising program instructions, wherein the programming instructions are executable by the processor to:
      obtain switch information for a plurality of switches, wherein at least a portion of the switch information is obtained from a server configured to maintain switch information about switches in two or more distinct Storage Area Network (SAN) fabrics;
      traverse the obtained switch information to determine interconnection information for the plurality of switches, wherein the interconnection information includes information about how each of the plurality of switches is connected to other devices, and wherein to traverse the obtained switch information the programming instructions are further executable by the processor to determine which of the plurality of switches are in each distinct SAN fabric and how each of the plurality of switches is connected to other devices in its respective SAN fabric; and
      generate SAN fabric information describing a plurality of distinct SAN fabrics each comprising one or more of the plurality of switches from the determined interconnection information, wherein the SAN fabric information includes information indicating which of the plurality of switches are in each distinct SAN fabric and how each of the plurality of switches is connected to other devices in its respective SAN fabric.

8. The system as recited in claim 7, wherein, to obtain switch information for a plurality of switches, the programming instructions are further executable by the processor to obtain at least a portion of the switch information from the switches.

9. The system as recited in claim 7, wherein, to obtain switch information for a plurality of switches, the programming instructions are further executable by the processor to obtain the switch information over a network separate from the SAN fabrics.

10. The system as recited in claim 7, wherein, to traverse the switch information to determine interconnection information for the plurality of switches, the programming instructions are further executable by the processor to, for each switch for which there is switch information:
   generate a switch object for the switch;
   insert the switch object in a map of switch objects according to the switch's interconnection with others of the switches;
   if the switch is a primary switch of a SAN fabric, generate a fabric object representing the SAN fabric and add the fabric object to a list of fabric objects; and
   for each port of the switch, if the port is connected to another switch, obtain switch information for the connected switch and add the switch information for the connected switch to the obtained switch information for the plurality of switches.

11. The system as recited in claim 10, wherein, to generate SAN fabric information describing a plurality of distinct SAN fabrics each comprising one or more of the plurality of switches from the determined interconnection information, the programming instructions are further executable by the processor to, for each fabric object in the list of fabric objects:
   get a switch object representing the primary switch of the SAN fabric represented by the fabric object from the map of switch objects;
   indicate in the fabric object that the primary switch is a component of the SAN fabric represented by the fabric object; and
   for each switch interconnected with the primary switch according to the map of switch objects, indicate in the fabric object that the interconnected switch is a component of the SAN fabric represented by the fabric object.

12. A system, comprising:
   means for obtaining switch information for a plurality of switches, wherein at least a portion of the switch information is obtained from a server configured to maintain switch information about switches in two or more distinct Storage Area Network (SAN) fabrics;
   means for traversing the obtained switch information to determine interconnection information for the plurality of switches, wherein the interconnection information includes information about how each of the plurality of switches is connected to other devices, and wherein said traversing comprises determining which of the plurality of switches are in each distinct SAN fabric and how each of the plurality of switches is connected to other devices in its respective SAN fabric; and
   means for generating SAN fabric information describing a plurality of distinct SAN fabrics each comprising one or more of the plurality of switches from the determined interconnection information, wherein the SAN fabric information includes information indicating which of the plurality of switches are in each distinct SAN fabric and how each of the plurality of switches is connected to other devices in its respective SAN fabric.

13. A computer-accessible storage medium, comprising program instructions, wherein the program instructions are computer-executable to implement:
   obtaining switch information for a plurality of switches, wherein at least a portion of the switch information is obtained from a server that maintains switch information about switches in two or more distinct Storage Area Network (SAN) fabrics;
   traversing the obtained switch information to determine interconnection information for the plurality of switches, wherein the interconnection information includes information about how each of the plurality of switches is connected to other devices, and wherein said traversing comprises determining which of the plurality of switches are in each distinct SAN fabric and how each of the plurality of switches is connected to other devices in its respective SAN fabric; and
   generating SAN fabric information describing a plurality of distinct SAN fabrics each comprising one or more of the plurality of switches from the determined interconnection information, wherein the SAN fabric information includes information indicating which of the plurality of switches are in each distinct SAN fabric and how each of the plurality of switches is connected to other devices in its respective SAN fabric.

14. The computer-accessible storage medium as recited in claim 12, wherein at least a portion of the switch information is obtained from the switches.

15. The computer-accessible storage medium as recited in claim 12, wherein the switch information is obtained over a network separate from the SAN fabrics.

16. The computer-accessible storage medium as recited in claim 13, wherein, in said traversing the switch information to determine interconnection information for the plurality of switches, the program instructions are further computer-executable to implement, for each switch for which there is switch information:
   generating a switch object for the switch;
   inserting the switch object in a map of switch objects according to the switch's interconnection with others of the switches;
   if the switch is a primary switch of a SAN fabric, generating a fabric object representing the SAN fabric and adding the fabric object to a list of fabric objects each representing a SAN fabric; and
   for each port of the switch, if the port is connected to another switch, obtaining switch information for the connected switch and adding the switch information for the connected switch to the obtained switch information for the plurality of switches.

17. The computer-accessible storage medium as recited in claim 16, wherein said generating SAN fabric information describing a plurality of distinct SAN fabrics each comprising one or more of the plurality of switches from the determined interconnection information, the program instructions are further computer-executable to implement, for each fabric object in the list of fabric objects:
   getting a switch object representing the primary switch of the SAN fabric represented by the fabric object from the map of switch objects;
   indicating in the fabric object that the primary switch is a component of the SAN fabric represented by the fabric object; and
   for each switch interconnected with the primary switch according to the map of switch objects, indicating in the fabric object that the interconnected switch is a component of the SAN fabric represented by the fabric object.

* * * * *